F. G. ALBORN.
RADIATOR MOUNTING FOR MOTOR VEHICLES.
APPLICATION FILED APR. 14, 1919.

1,406,163.

Patented Feb. 14, 1922.
2 SHEETS—SHEET 1.

Inventor:
Frans G. Alborn,
by Emery, Booth, Janney & Varney
Attys.

F. G. ALBORN.
RADIATOR MOUNTING FOR MOTOR VEHICLES.
APPLICATION FILED APR. 14, 1919.

1,406,163.

Patented Feb. 14, 1922.
2 SHEETS—SHEET 2.

Inventor:
Frans G. Alborn,
by Emery, Booth, Janney & Varney
Attys.

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

RADIATOR MOUNTING FOR MOTOR VEHICLES.

1,406,163. Specification of Letters Patent. Patented Feb. 14, 1922.

Application filed April 14, 1919. Serial No. 289,852.

*To all whom it may concern:*

Be it known that I, FRANS G. ALBORN, a citizen of the United States, and a resident of Milford, county of New Haven, and State of Connecticut, have invented an Improvement in Radiator Mountings for Motor Vehicles, of which the following description, in connection with the accompanying drawings, is a specification, like characters on the drawings representing like parts.

This invention relates to radiator mountings for motor vehicles, and is more especially concerned with improved cushioning means to absorb shocks, and to prevent injury to the radiator.

My invention will be best understood by reference to the following description, when taken in connection with the accompanying drawings of one illustrative embodiment of my invention, while its scope will be more particularly pointed out in the appended claims.

Figure 1:
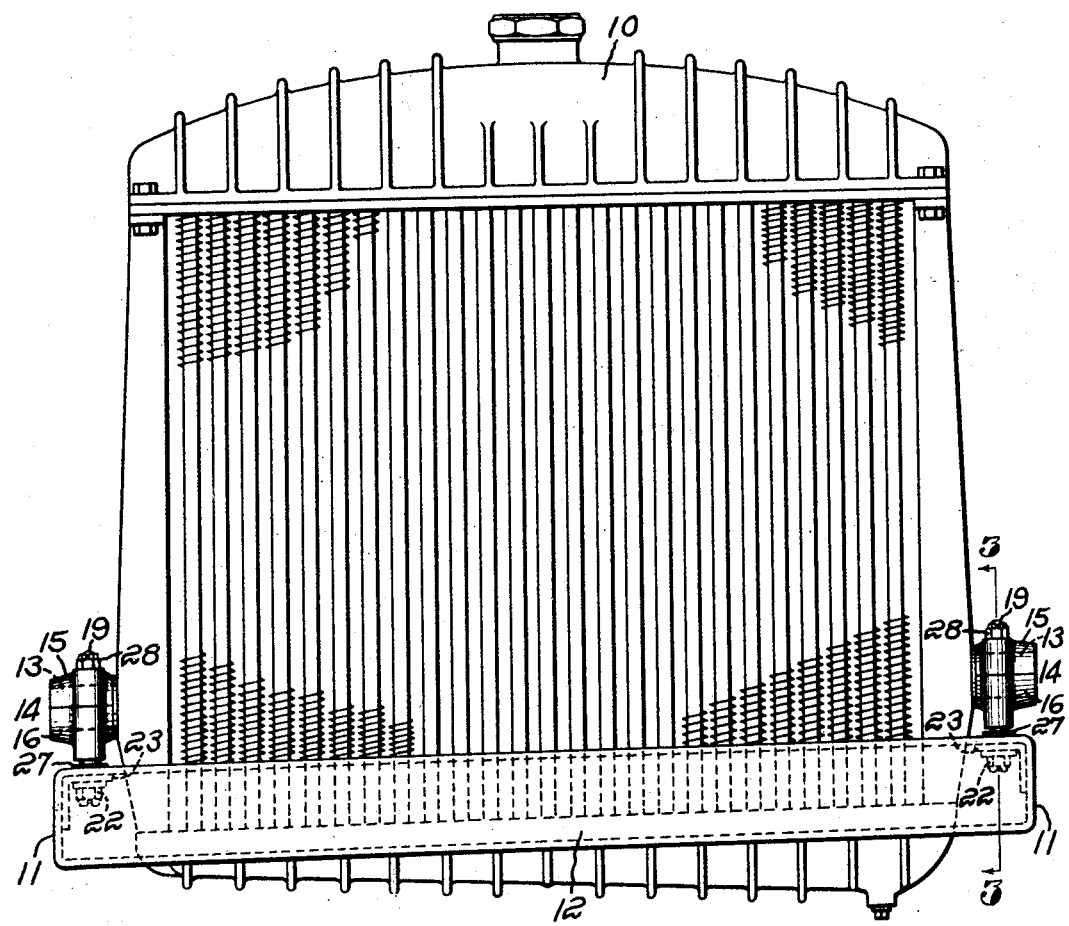
Fig. 1 is a front elevation of a portion of the motor vehicle having a radiator equipped with radiator mountings exemplifying my invention.
Figure 2:
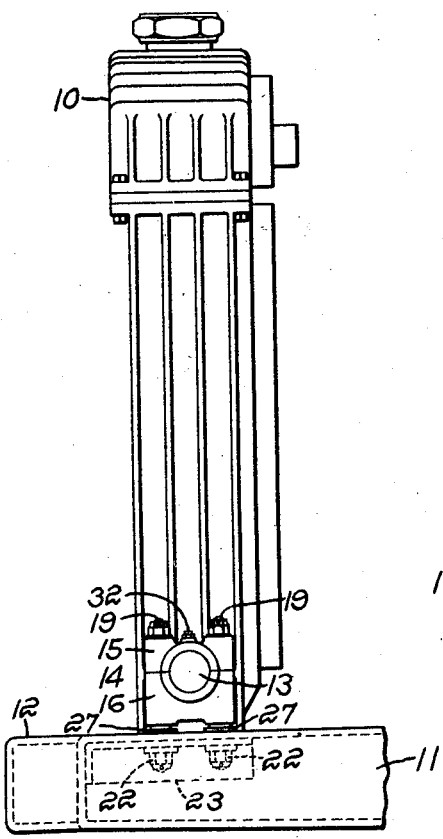
Fig. 2 is a side elevation of the same.
Figure 3:
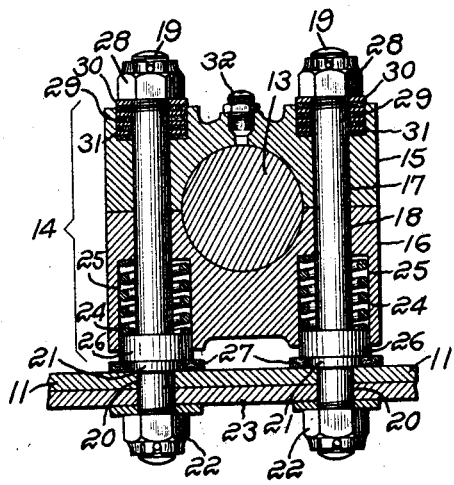
Fig. 3 is a sectional view on an enlarged scale on line 3—3 of Fig. 1.

Referring to the drawings, and to the embodiment of my invention which I have selected for exemplification, I have shown the front portion of a motor vehicle having a radiator 10, which may be of any usual or desired construction, supported on the chassis frame, the latter herein comprising a pair of longitudinal members 11, and a transverse member 12. It should be understood, of course, that the radiator is intended to form a part of the cooling system of the power plant, and may be the condenser of a steam system, or cooler for the jacket water of an internal combustion engine. It is well known that radiators of this class are of rather delicate construction, and are likely to be injured by shocks transmitted thereto through the chassis frame on which the radiator is supported. The mounting which I will now describe absorbs these shocks, and in addition prevents distortion of the frame from being imparted to the radiator.

The radiator is herein provided with a pair of axially aligned horizontal trunnions 13, mounted to turn in trunnion bearings 14, each comprising upper and lower bearing members 15 and 16. This construction permits the radiator to swing to and fro about the common axis of the trunnions. It is usual to provide a rod connected to the upper portion of the radiator, to prevent undue forward and backward displacement of the radiator, but this is not shown herein, because it forms no part of my invention.

Suitable cushioning means are interposed between the trunnion bearings 14 and the chassis frame to relieve shocks which would otherwise be transmitted to the radiator, and herein the construction is such as to allow the cushioning means to take care of frame distortion by allowing the upper and lower bearing members 15 and 16 to separate in opposition to the cushioning means. In the present example, the upper and lower bearing members 15 and 16 are provided with pairs of aligned holes 17 and 18, to receive vertical guide-rods or studs 19, on which said members are mounted to slide vertically. These studs are herein suitably secured to the chassis frame, as by providing the frame members 11 with holes 20 to receive said studs, while the latter are provided with shoulders 21, which rest upon the frame members and are held firmly seated thereon by nuts 22 threaded onto the lower ends thereof. Preferably, the frame is suitably reinforced at this point by the provision of a reinforcing member 23.

Herein, the trunnion bearings are suitably supported, as by helically-coiled springs 24, encircling the studs 19. Preferably these springs are completely housed to protect them from injury, as well as from the action of dust, water and other foreign matter, and to this end, the lower bearing member is provided with a pair of spring chambers 25, in which said springs are received. The lower ends of these chambers are closed by annular enlargements or collars 26 on the studs 19, said enlargements having a working fit in their respective chambers, and providing abutments for the lower ends of the springs. Suitable clearance is provided below the bearing members 16 to allow the latter to move toward the frame in opposition to the springs 24. Preferably, cushioning means are provided to limit the downward movement of the bearing members, such means herein comprising yielding washers 27 conveniently formed of leather, or other suitable substance, the same encircling the shoulders 21, and being held between the annular enlargements 26 and the frame member 11. Thus it is evident that these washers act also as buffers for the bearing member to strike, in case the springs should yield sufficiently to allow the bearing member to descend that far.

Upward movement of the trunnion bearings is limited by stops conveniently provided in the form of nuts 28 threaded onto the upper ends of the studs 19. Preferably, the upward movement is cushioned by suitable means, and herein I have provided for this purpose a plurality of buffer washers 29, alternating with metallic washers 30 encircling the studs 19 beneath the nuts 28. The buffer washers may be made of suitable cushioning material, such as cork or cork composition, which is found to give good results in service, and possesses a considerable amount of resiliency, so that it is not apt to become permanently diminished in thickness. Preferably, the cushioning means just described is suitably housed to prevent injury from dust, water and other foreign substances, and to this end, the upper bearing member 15 is herein provided with chambers 31, in which the washers 29 and 30 are received. Lubrication for the trunnions and trunnion bearings is herein provided by suitable oil cups 32.

It should now be evident that the described mounting permits a certain amount of relative vertical movement of the frame and radiator cushioned at both ends of the travel, thereby absorbing shocks which would otherwise be transmitted to the radiator. Frame distortions are taken care of, thereby preventing danger of injuring the radiator by relative vertical movement or separation of the bearing members 15 and 16, in opposition to the springs 24. Moreover, the bearings are, or may be, self-adjusting, because the springs urge the bearing members toward each other.

Having thus described one embodiment of my invention, but without limiting myself thereto, what I claim and desire by Letters Patent to secure is:

1. In a motor vehicle, the combination of a frame, a radiator having a pair of axially aligned, horizontal trunnions, a pair of trunnion bearings in which said trunnions are mounted to turn, means supported on said frame to guide said bearings vertically, and means yieldingly resisting vertical movement of said bearings.

2. In a motor vehicle, the combination of a frame, a radiator and radiator supporting means comprising a pair of axially aligned, horizontal trunnions, a pair of trunnion bearings in which said trunnions are mounted to turn, means supported on said frame to guide said trunnions and their bearings vertically, and means yieldingly resisting vertical movement of said trunnions and their bearings.

3. In a motor vehicle, the combination of a frame, a radiator and radiator supporting means comprising a pair of axially aligned, horizontal trunnions, a pair of trunnion bearings in which said trunnions are mounted to turn, means supported on said frame to guide said trunnions and their bearings vertically, and upper and lower cushioning means for said trunnions and their bearings.

4. In a motor vehicle, the combination of a frame, a radiator having a pair of axially aligned, horizontal trunnions, a pair of trunnion bearings in which said trunnions are mounted to turn, means supported on said frame to guide said bearings vertically, and means within said bearings yieldingly resisting vertical movement of said bearings.

5. In a motor vehicle, the combination of a frame, a radiator having a pair of axially aligned, horizontal trunnions, a pair of trunnion bearings in which said trunnions are mounted to turn, said bearings being provided with vertical holes, vertical guide-rods supported on said frame and received in said holes, and means yieldingly resisting vertical movement of said bearings.

6. In a motor vehicle, the combination of a frame, a radiator having a pair of axially aligned, horizontal trunnions, a pair of trunnion bearings in which said trunnions are mounted to turn, said bearings being provided with vertical holes, vertical guide-rods supported on said frame and received in said holes, and means encircling said rods and yieldingly resisting vertical movement of said bearings.

7. In a motor vehicle, the combination of a frame, a radiator having a pair of axially aligned, horizontal trunnions, a pair of trunnion bearings in which said trunnions are mounted to turn, said bearings being provided with vertical holes, vertical guide-rods supported on said frame and received in said holes, and means housed within said bearings and yieldingly resisting vertical movement of said bearings.

8. In a motor vehicle, the combination of a frame, a radiator having a pair of horizontal trunnions, and trunnion-supporting means supported on said frame, said means comprising upper and lower trunnion-bearing members, and resilient means urging said members toward each other.

9. In a motor vehicle, the combination of a frame, a radiator having a pair of horizontal trunnions, and trunnion-supporting means supported on said frame, said means comprising upper and lower trunnion-bearing members, and resilient means yieldingly resisting relative, vertical movement of said members.

10. In a motor vehicle, the combination of a frame, a radiator having a pair of horizontal trunnions, and trunnion-supporting means supported on said frame, said means comprising upper and lower trunnion-bearing members, and resilient means supporting the lower member and urging the same toward the upper member.

11. In a motor vehicle, the combination of a frame, a radiator having a pair of horizontal trunnions, and trunnion-supporting means supported on said frame, said means comprising upper and lower trunnion-bearing members, resilient means supporting the lower member and urging the same toward the upper member, and yielding means limiting the upward movement of the upper member.

12. In a motor vehicle, the combination of a frame, a radiator having a pair of horizontal trunnions, and trunnion-supporting means supported on said frame, said means comprising upper and lower trunnion-bearing members, a guide rod on which said members are mounted to slide vertically, and resilient means encircling said guide-rod and urging said members toward each other.

13. In a motor vehicle, the combination of a frame, a radiator having a pair of horizontal trunnions, and trunnion-supporting means supported on said frame, said means comprising upper and lower trunnion-bearing members, a guide-rod on which the lower member is mounted to slide vertically, and resilient means encircling said guide-rod and urging the lower member toward the upper member.

14. In a motor vehicle, the combination of a frame, a radiator having a pair of horizontal trunnions, and trunnion-supporting means supported on said frame, said means comprising upper and lower trunnion-bearing members, the lower member being provided with a chamber, and resilient means in said chamber supporting said members.

15. In a motor vehicle, the combination of a frame, a radiator having a pair of horizontal trunnions, and trunnion-supporting means supported on said frame, said means comprising upper and lower trunnion-bearing members, said members being provided with chambers, and cushioning means in said chambers.

16. In a motor vehicle, the combination of a frame, a radiator having a pair of horizontal trunnions, and trunnion-supporting means supported on said frame, said means comprising upper and lower trunnion-bearing members, said members being provided with chambers, resilient means in the lower chamber supporting said members, and yielding means in the upper chamber limiting the upward movement of said upper member.

17. In a motor vehicle, the combination of a frame, a radiator having a pair of axially aligned, horizontal trunnions, a pair of trunnion bearings each comprising upper and lower bearing members provided with pairs of vertical holes at the front and rear, respectively, of said trunnions, pairs of guide-rods extending through said holes and secured to said frame, and springs encircling said rods, respectively, and supporting the lower bearing members.

18. In a motor vehicle, the combination of a frame, a radiator having a pair of axially aligned, horizontal trunnions, a pair of trunnion bearings each comprising upper and lower bearing members provided with pairs of aligned, vertical holes and chambers at the front and rear, respectively, of said trunnions, pairs of guide-rods extending through said holes and secured to said frame, and cushioning means encircling said rods and received in said chambers.

19. In a motor vehicle, the combination of a frame, a radiator having a pair of axially aligned, horizontal trunnions, a pair of trunnion bearings each comprising upper and lower bearing members provided with pairs of aligned, vertical holes and upper and lower chambers at the front and rear, respectively, of said trunnions, pairs of guide-rods extending through said holes and secured to said frame, and cushioning means encircling said rods and received in said chambers.

20. In a motor vehicle, the combination of a frame, a radiator having a pair of axially aligned, horizontal trunnions, a pair of trunnion bearings each comprising upper and lower bearing members provided with pairs of aligned, vertical holes and upper and lower chambers at the front and rear, respectively, of said trunnions, pairs of guide-rods extending through said holes and secured to said frame, springs encircling said rods, respectively, and received in said lower chambers and supporting the lower bearing members, and cushioning means encircling said rods, respectively, and received in said upper chambers.

In testimony whereof, I have signed my name to this specification.

FRANS G. ALBORN.